(12) United States Patent
Kawamura

(10) Patent No.: US 8,629,090 B2
(45) Date of Patent: Jan. 14, 2014

(54) RUST RESISTING GREASE COMPOSITION, GREASE-ENCLOSED BEARING, AND RUST RESISTING AGENT FOR USE IN GREASE COMPOSITION

(75) Inventor: Takayuki Kawamura, Kuwana (JP)

(73) Assignee: NTN Corporation, Osaka (JP)

( * ) Notice: Subject to any disclaimer, the term of this patent is extended or adjusted under 35 U.S.C. 154(b) by 1990 days.

(21) Appl. No.: 11/547,554

(22) PCT Filed: Mar. 25, 2005

(86) PCT No.: PCT/JP2005/005474
§ 371 (c)(1),
(2), (4) Date: Sep. 29, 2006

(87) PCT Pub. No.: WO2005/097954
PCT Pub. Date: Oct. 20, 2005

(65) Prior Publication Data
US 2007/0161520 A1 Jul. 12, 2007

(30) Foreign Application Priority Data
Apr. 2, 2004 (JP) ................................. 2004-109557

(51) Int. Cl.
*C10M 111/04* (2006.01)
*C10M 133/20* (2006.01)

(52) U.S. Cl.
USPC ......................................... 508/110; 508/528

(58) Field of Classification Search
USPC ......................................... 508/485, 110, 528
See application file for complete search history.

(56) References Cited

U.S. PATENT DOCUMENTS

| 2,398,193 | A | 4/1946 | Sharpe | |
|---|---|---|---|---|
| 2,711,374 | A | 6/1955 | Wasson | |
| 6,251,841 | B1 | 6/2001 | Koizumi et al. | |
| 2003/0176298 | A1 * | 9/2003 | Nakatani et al. | 508/398 |
| 2004/0224859 | A1 * | 11/2004 | Numazawa et al. | 508/364 |
| 2005/0261141 | A1 * | 11/2005 | Iso et al. | 508/154 |

FOREIGN PATENT DOCUMENTS

| DE | 199 14 498 A1 | 3/1999 |
|---|---|---|
| JP | 03-200898 | 9/1991 |
| JP | 05-263091 | 10/1993 |
| JP | 06-200273 | 7/1994 |

(Continued)

OTHER PUBLICATIONS

International Search Report, Jun. 20, 2005.

(Continued)

*Primary Examiner* — Jim Goloboy

(74) *Attorney, Agent, or Firm* — Hedman & Costigan, P.C.; James V. Costigan; Kathleen A. Costigan

(57) ABSTRACT

The present invention provides a rust resisting grease composition showing an excellent rust resisting performance without using nitrites and the grease composition-enclosed bearing. The rust resisting grease composition contains a base oil, a thickener, and a rust resisting component. The rust resisting component contains a metallic salt of a polybasic acid, a polyvalent alcohol in which a part of a hydroxyl group is blocked, and at least one compound selected from an organic sulfonate and a fatty ester. The content of the component is 0.1 to 10 parts by weight based on the total amount of the base oil and the thickener. The base oil contains at least one oil selected from synthetic hydrocarbon oil and ether oil. The thickener is a urea thickener. The content of the thickener is 5 to 30 parts by weight based on the total amount of the base oil and the thickener.

27 Claims, 1 Drawing Sheet

(56) References Cited

FOREIGN PATENT DOCUMENTS

| JP | 11-279578 | 10/1999 |
| JP | 2003-106338 | 4/2003 |
| JP | 2004-051912 | 2/2004 |

OTHER PUBLICATIONS

EP Search Report Dated Dec. 23, 2009.

* cited by examiner

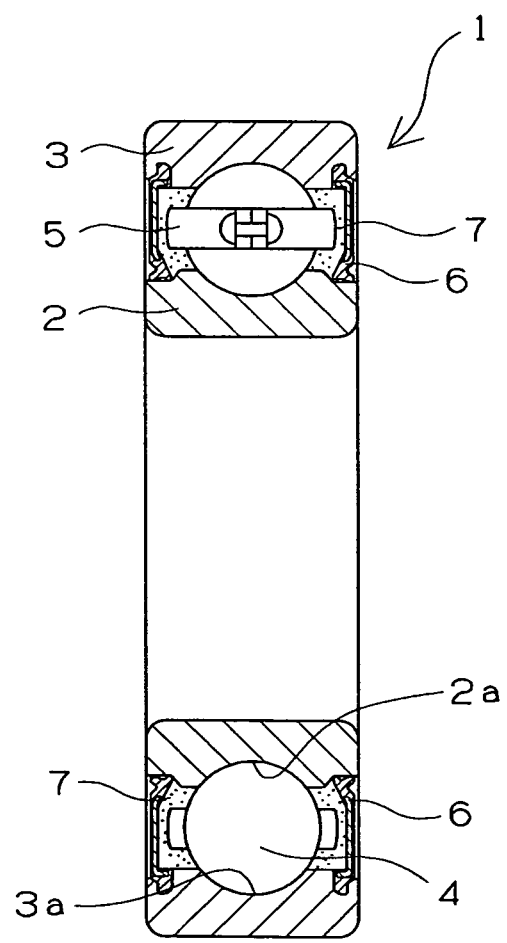

RUST RESISTING GREASE COMPOSITION, GREASE-ENCLOSED BEARING, AND RUST RESISTING AGENT FOR USE IN GREASE COMPOSITION

TECHNICAL FIELD

The present invention relates to a rust resisting grease composition excellent in its rust resisting performance; a grease-enclosed bearing in which the rust resisting grease composition is enclosed; and a rust resisting agent, for use in the grease composition, consisting of a rust resisting component contained in the rust resisting grease composition.

BACKGROUND ART

It is important to prevent generation of rust on a rolling bearing which is used in an electric auxiliary machine for use in a car to or into which water on a road, salt water or seawater is liable to attach or penetrate during travel of the car and on a rolling bearing which is used in iron-manufacturing equipment such as a rolling roller always subjected to penetration of cooling water.

A car travels on the seashore and a road on which calcium chloride or the like is scattered to prevent the surface of the road from being frozen. Thus the use of the car has diversified and grease is increasingly demanded to have a high rust resisting performance.

Further owing to the transition of molding powder which is used in a successive casting equipment of an iron-manufacturing industry, a part of the components of the molding powder dissolves in cooling water. Thereby the generation of rust is accelerated. Consequently grease is increasingly demanded to have a high rust. resisting performance.

To restrain the generation of rust, the rolling bearing is appropriately sealed or a mechanical measure is taken to thereby prevent the penetration of substances causing the generation of rust. For example, in a car, a measure of disposing an alternator or the like at a position where the rolling bearing is not splashed with muddy water and a measure of mounting a mudguard thereon are taken. But it is impossible to completely seal the rolling bearing owing to its mechanism. Thus the lubricating grease to be enclosed in the rolling bearing is demanded to have an excellent rust resisting performance.

Conventionally, as rust resisting grease excellent in its rust resisting performance, an oil-soluble inhibitor serving as a rust resisting agent, a water-soluble inorganic passivating agent, and a grease composition containing a nonionic surface active agent are known (see patent document 1).

As a grease-enclosed rolling bearing for use in an alternator, a grease composition containing a passivating oxidizing agent, organic sulfonate, and polyvalent alcohol ester is known (see patent document 2).

It is known that sodium nitrite excellent as a water-soluble inorganic passivating agent reacts with secondary amine in an acidic condition to generate nitrosamine. The nitrosamine is a substance of applying a load to environment. The following grease composition to be enclosed in a bearing is known. The grease composition contains 0.1 to 10 parts by weight of each based on the total amount of the grease composition of a lipophilic organic inhibitor, a nonionic surface active agent, and a hydrophilic organic inhibitor selected from among a lanolin fatty acid derivative and an alkanolamine derivative modified with a hydrophilic radical; and barium sulfonate serving as a rust resisting agent (see patent document 3).

In addition, as an additive not containing nitrite which is the substance of applying a load to environment, a grease composition containing ester of polyvalent alcohol and synthetic hydrocarbon oil as the base oil thereof is known (see patent document 4).

But there is a fear that the grease containing the sodium nitrite adversely affects the environment of the earth. When a demand for a high rust resisting performance becomes strong, there is a case in which the grease composition containing the ester of the polyvalent alcohol and the synthetic hydrocarbon oil as the base oil thereof has an insufficient rust resisting performance.

Patent document 1: Japanese Patent Application Laid-Open No. 3-200898
Patent document 2: Japanese Patent Application Laid-Open No. 5-263091
Patent document 3: Japanese Patent Application Laid-Open No. 11-279578
Patent document 4: Japanese Patent Application Laid-Open No. 2004-51912

DISCLOSURE OF THE INVENTION

Problem to be Solved by the Invention

The present invention has been made to cope with the above-described problems. Therefore it is an object of the present invention to provide a rust resisting grease composition displaying an excellent rust resisting performance without using nitrites, a grease-enclosed bearing in which the rust resisting grease composition is enclosed, and a rust resisting agent for use in the grease composition.

Means for Solving the Problem

A rust resisting grease composition of the present invention contains base oil, a thickener, and a rust resisting component, wherein the rust resisting component contains a metallic salt of a polybasic acid, a polyvalent alcohol in which a part of a hydroxyl group is blocked, and at least one compound selected from among an organic sulfonate and a fatty ester as essential ingredients thereof.

The content of each of the above-described essential ingredients is set to 0.1 to 10 parts by weight based on 100 parts by weight of the total amount of the base oil and the thickener.

The base oil contains at least one oil selected from among synthetic hydrocarbon oil and ether oil.

The thickener is a urea thickener; and the content of the thickener is set to 5 to 30 parts by weight based on 100 parts by weight of the total amount of the base oil and the thickener.

The metallic salt of the polybasic acid is a metallic salt of a dibasic acid; and the polyvalent alcohol in which a part of the hydroxyl group is blocked is a partially esterified sorbitan.

A grease-enclosed bearing of the present invention has a grease composition enclosed in a sliding portion thereof. The grease-enclosed bearing is a bearing for use in an electric auxiliary machine for use in a car or in iron-manufacturing equipment.

A rust resisting agent of the present invention for use in a grease composition contains a metallic salt of a polybasic acid, a polyvalent alcohol in which a part of a hydroxyl group is blocked, and at least one compound selected from among an organic sulfonate and a fatty ester.

Effect of the Invention

In the rust resisting grease composition of the present invention, the three compounds are used as essential ingredients of the rust resisting component: (1) the metallic salt of the polybasic acid, (2) the polyvalent alcohol in which a part of the hydroxyl group is blocked, and (3) at least one compound selected from among the organic sulfonate and the fatty ester. Therefore the rust resisting grease composition excellent in its rust resisting performance can be obtained without containing the nitrite.

The grease-enclosed bearing of the present invention does not contain the nitrite which is the substance of applying a load to environment and has an excellent rust resisting performance. Therefore the grease-enclosed bearing is preferable as a bearing for use in the electric auxiliary machine for use in a car which is required to be rust-resisting or a bearing which is used in the iron-manufacturing equipment required to be rust-resisting.

Because the rust resisting agent of the present invention for use in the grease composition contains the above-described compounds as its essential components, the rust resisting agent is excellent in environmental resistance and can be used favorably as the rust resisting agent for use in the grease composition required to be rust-resisting.

BRIEF DESCRIPTION OF THE DRAWINGS

FIG. 1 is a sectional view of a deep groove ball bearing.

EXPLANATION OF REFERENCE SYMBOLS AND NUMERALS

1: grease-enclosed bearing
2: inner ring
3: outer ring
4: rolling element
5: cage
6: sealing member
7: grease

BEST MODE FOR CARRYING OUT THE INVENTION

It has been found that by using a rust resisting component containing three compounds, (1) a metallic salt of a polybasic acid, (2) a polyvalent alcohol in which a part of a hydroxyl group is blocked, and (3) at least one compound selected from among an organic sulfonate and a fatty ester as essential ingredients thereof, the rust resisting performance of grease can be considerably improved, even though the grease does not contain nitrites such as sodium nitrite. Particularly it has been found that by using (1) the metallic salt of a polybasic acid and (2) the polyvalent alcohol in which a part of the hydroxyl group is blocked as essential ingredients and by mixing (3) at least one compound selected from among the organic sulfonate and the fatty ester with these two essential ingredients (1) and (2), the rust resisting performance can be considerably improved. It is considered that the rust resisting effect increases owing to the combination of the above-described three compounds. The present invention is based on the above-described finding.

The metallic salts of the polybasic acid mixed with the grease composition as a rust resisting component obtained by mixing the thickener to the base oil is a compound in which hydrogen atoms of a carboxyl group of the a dibasic acid or higher polybasic acid are replaced with metallic atoms. Of the polybasic acids, a dibasic acid is preferable. For example, sebacic acid, azelaic acid, succinic acid, and the like are listed. As the metallic atoms, those of alkali metal and alkali earth metal are preferable. Lithium, sodium, and potassium of the alkali metal are especially preferable.

As the metallic salt of the polybasic acid which can be preferably used in the present invention, the metallic salt of the dibasic acid is preferable. Sodium sebacate is especially preferable. As a result of experiments, it has been found that a rust resisting effect is increased by using the sodium sebacate as the essential ingredient of the rust resisting grease composition and by mixing the sodium sebacate with the compounds of the above-described (2) and (3).

The polyvalent alcohol, to be used as one of the rust resisting components, in which a part of the hydroxyl group is blocked means a compound in which a part of the hydroxyl group of the polyvalent alcohol is protected. In the present invention, "blocked" means that hydrogen atoms of the hydroxyl group are replaced. Esterified or acetylated hydroxyl group is exemplified. In the present invention, ester formed from the polyvalent alcohol and fatty acid is especially preferable.

As the polyvalent alcohol, aliphatic polyvalent alcohols such as glycerin, polyglycerin, sorbitol, sorbitan, pentaerythritol, trimethylolpropane are listed. The fatty acid forming esters with the polyvalent alcohol is a compound indicated by RCOOH in which R indicates a saturated or unsaturated hydrocarbon group.

Higher fatty acid is preferable as the fatty acid. For example, lauric acid, myristic acid, palmitic acid, beef tallow acid, stearic acid, caproleic acid, undecylic acid, Lynn Dell acid, tsuzuic acid, FIZETERIN acid, myristoleic acid, palmitoleic acid, petroselinic acid, oleic acid, elaidic acid, asclepinic acid, vaccenic acid, sorbic acid, linoleic acid, linolenic acid, sabinic acid, ricinoleic acid, and behenic acid.

Of the polyvalent alcohols in which a part of the hydroxyl group is blocked, sorbitan fatty ester is preferable. Sorbitan trioleate is especially preferable. By using the polyvalent alcohols in combination with poly-α-olefin oil, the rust resisting performance can be improved to a higher extent.

It is preferable that the rust resisting component contains (1) the metallic salt of the polybasic acid and (2) the polyvalent alcohol in which a part of the hydroxyl group is blocked as essential ingredients thereof and that a third ingredient is added to these compounds.

The third ingredient that can be used as the rust resisting components is the organic sulfonate, the fatty ester or a mixture of the organic sulfonate and the fatty ester.

The organic sulfonate is a salt of sulfonic acid ($RSO_3H$) and indicated by $RSO_3M$. As the sulfonic acid, petroleum sulfonic acid and dinonyl naphthalenesulfonic acid are listed. As M, metals such as barium, calcium, zinc, sodium, lithium, and magnesium; and amines such as $NH_4$, $H_2N(CH_2)_2NH_2$ are listed. Of the above-described substances, a calcium salt of the sulfonic acid or a sodium salt thereof is preferable.

As the acid component of the fatty ester, succinic acid, stearic acid, oleic acid, and the like are listed. As the alcohol component thereof, isopropyl alcohol, 2-ethylhexyl alcohol, n-octyl alcohol, and oleyl alcohol are listed. Of these substances, succinate is preferable.

The content of each essential ingredient of the rust resisting component is set to 0.1 to 10 parts by weight and preferably 0.3 to 3 parts by weight based on 100 parts by weight of the total amount of said base oil and said thickener. If the content of each essential ingredient of the rust resisting component that can be used in the present invention is less than 0.1 parts by weight, the rust resisting performance thereof deteriorates. If the content of each essential ingredient of the rust resisting component is more than 10 parts by weight, the lubricating property thereof deteriorates.

As the base oil that can be preferably used in the present invention, synthetic hydrocarbon oil, ether oil, and a mixture of the synthetic hydrocarbon oil and the ether oil are listed. As the base of the present invention, the mixture of the synthetic hydrocarbon oil and the ether oil is preferable.

The synthetic hydrocarbon oil that can be used in the present invention is a hydrocarbon compound consisting of carbon and hydrogen, and poly-α-olefin oil, a copolymer of α-olefin and olefin, aliphatic hydrocarbon oil such as polybutene, and aromatic hydrocarbon oil such as alkylbenzene, alkylnaphthalene, polyphenyl, and synthetic naphthene are listed.

As the synthetic hydrocarbon oil preferable in the present invention, aliphatic hydrocarbon oil showing an excellent rust resisting effect owing to the co-existence with the above-described rust resisting component can be used. Of the aliphatic hydrocarbon oil, the poly-α-olefin oil and the copolymer of the α-olefin and the olefin are preferable. These aliphatic hydrocarbon oils are formed as oligomers which is the low-molecular weight polymer of the α-olefin, each having a structure in which hydrogen is added to a terminal double bond.

It is preferable that not less than 10 parts by weight of the synthetic hydrocarbon oil is added to 100 parts by weight of the base oil. If the content of the synthetic hydrocarbon oil is less than 10 parts by weight, the grease composition is inferior in its rust resisting performance when the synthetic hydrocarbon oil is used in combination with the rust resisting component.

As the ether oil which can be used in the present invention, ether oils such as alkyl diphenyl ether oil, alkyl triphenyl ether oil, alkyl tetraphenyl ether oil, and dialkyldiphenyl ether oil are listed.

In addition to the above-described synthetic hydrocarbon oil and ether oil, mineral oil and ester oil are listed as the base oil that can be used in the present invention.

More specifically, as the mineral oil, it is possible to list paraffin mineral oil and naphthene mineral oil. As the ester oil, it is possible to list diester oil, polyol ester oil, complex ester oil of these oils, and aromatic ester oil.

As the thickener that can be used in the present invention, a urea thickener is preferable. As a urea compound that is used as the urea thickener, diurea shown by a formula (1) or polyurea is favorable. The diurea is more favorable. Any of aliphatic, alicyclic, aromatic urea compounds can be used at a desired mixing ratio.

[Chemical formula 1]

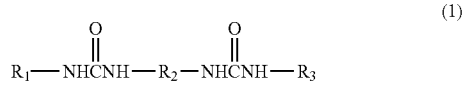

(1)

$R_2$ in the formula (1) indicates an aromatic hydrocarbon group, an aliphatic hydrocarbon group or an alicyclic hydrocarbon group having 6 to 15 carbon atoms. $R_1$ and $R_3$ indicate any one of the aromatic hydrocarbon group having 6 to 12 carbon atoms, a cyclohexyl group having 6 to 12 carbon atoms, a cyclohexyl derivative having 7 to 12 carbon atoms, and an alkyl group having 6 to 20 carbon atoms.

The content of the urea thickener that can be used in the present invention is set to 5 to 30 parts by weight based on 100 parts by weight of the total amount of said base oil and said thickener. If the content of the urea thickener is less than 5 parts by weight, the grease becomes liquid and has a low viscosity and is liable to leak. Thus it is difficult to enclose the grease in a bearing. If the content of the urea thickener is more than 30 parts by weight, the grease becomes solid and the consistency thereof becomes less than 200. Therefore the grease cannot be practically used as the grease to be enclosed in the bearing.

The urea compound is prepared by reacting an isocyanate compound with an amino compound. To prevent a reactive free radical from remaining, it is preferable to use the isocyanate group of the isocyanate compound and the amino group of the amino compound in an equivalent weight.

To obtain the grease composition, the reaction between the isocyanate compound and the amino compound may be allowed in the base oil. The urea compound synthesized in advance may be mixed with the base oil. The former method is preferable because the former method is capable of keeping the stability of the grease.

The rust resisting grease composition of the present invention contains the base oil, the thickener, and the rust resisting component as its essential components. In addition to these constituent components, the rust resisting grease composition may contain conventional additives for grease such as an extreme-pressure agent, an antioxidant, a metal-inactivating agent, and an oily agent. These additives are shown below.

Extreme-pressure Agent

By using the extreme-pressure agent, the withstand load and the extreme pressure resistance of the rust resisting grease composition can be improved. For example, it is possible to use the following compounds as necessary: As organometallic compounds, organic molybdenum compounds such as molybdenum dithiocarbamate and molybdenum dithiophosphate; organic zinc compounds such as zinc dithiocarbamate, zinc dithiophosphate, and zinc phenate; organic antimony compounds such as antimony dithiocarbamate and antimony dithiophosphate; organic selenium compounds such as selenium dithiocarbamate; organic bismuth compounds such as bismuth naphthenate and bismuth dithiocarbamate; organic iron compounds such as ferric dithiocarbamate and ferric octynoate; organic copper compounds such as copper dithiocarbamate and copper naphthenate; organic tin compounds such as tin maleate and dibutyltin sulfide; organic sulfonate, phenate, and phosphonate of alkali metal and alkali earth metal; and organometallic compounds containing gold, silver, titanium, cadmium, and the like. As sulfur-based compounds, it is possible to use a sulfide compound such as dibenzyl disulfide or a polysulfide compound, sulfurized fats and oils, compounds of ash-free carbamic acid, thiourea compounds, and thiocarbonates. As phosphoric acid-based extreme-pressure agents, it is possible to use phosphate such as trioctyl phosphate and tricresyl phosphate; and phosphate compounds such as acidic phosphate, phosphite, and acidic phosphite. In addition, it is possible to use halogen-based extreme-pressure agents such as chlorinated paraffin. In addition, it is possible to use molybdenum disulfide, tungsten disulfide, graphite, polytetrafluoroethylene, antimony sulfide, and solid lubricants consisting of boron compounds such as boron nitride. Of these extreme-pressure agents, compounds of dithiocarbamic acid and those of dithiophosphoric acid can be preferably used.

Antioxidant

As the antioxidant, an age resistor, an ozone deterioration preventive agent, and an antioxidant to be added to rubber, plastics, lubricant, and the like can be selectively used. For example, the following compounds can be used: amine compounds such as phenyl-1-naphtylamine, phenyl-2-naphtylamine, diphenyl-p-phenylenediamine, dipyridylamine, phenothiazine, N-methylphenothiazine, N-ethylphenothiazine, 3,7-dioctylphenothiazine, p,p-dioctyldiphenylamine, N,N-diisopropyl-p-phenylenediamine, and N,N-di-sec-butyl-p-phenylenediamine; and phenol compounds such as 2,6-di-t-dibutylphenol, and the like.

Metal-Inactivating Agent:

As the metal-inactivating agent, triazole compounds such as benzotriazole and tolyltriazole can be used.

Oily Agent

As the oily agents, the following compounds can be used: fatty acids such as oleic acid, stearic acid, and the like; fatty alcohols such as oleyl alcohol, and the like; phosphoric acid; and phosphates such as tricresyl phosphate, polyoxyethylene oleyl ether phosphate.

An example of the grease-enclosed bearing of the present invention is shown in FIG. 1. FIG. 1 is a sectional view of a deep groove ball bearing.

In a grease-enclosed bearing 1, an inner ring 2 having an inner ring rolling surface 2a on its peripheral surface and an outer ring 3 having an outer ring rolling surface 3a on its inner peripheral surface are concentrically disposed, and a plurality of rolling elements 4 is disposed between the inner ring rolling surface 2a and the outer ring rolling surface 3a. The grease-enclosed bearing 1 further includes a cage 5 holding the rolling elements 4 and a sealing member 6 fixed to the outer ring 3. Grease 7 is applied to at least the peripheries of rolling elements 4.

Because the additive not containing the nitrite is used for the grease 7, it is possible to obtain the grease-enclosed bearing 1 having an excellent environmental resistance. Further the grease 7 is superior in its rust resisting performance, it can be preferably used as a rolling bearing for use in an electric auxiliary machine of a car and iron-manufacturing equipment.

The rust resisting agent for use in the grease composition is obtained by mixing (1) the metallic salt of the polybasic acid, (2) the polyvalent alcohol in which a part of the hydroxyl group is blocked, and (3) at least one compound selected from among the organic sulfonate and the fatty ester with one another. The above-described compounds can be used as the components.

Regarding the mixing rate of each component, (1) the metal salt of the polybasic acid is set to 0.1 to 5 parts by weight and preferably 0.3 to 3 parts by weight. (2) The polyvalent alcohol in which a part of the hydroxyl group is blocked is set to 0.1 to 5 parts by weight and preferably 0.3 to 3 parts by weight. (3) at least one compound selected from among the organic sulfonate and the fatty ester is set to 0.1 to 5 parts by weight and preferably 0.3 to 3 parts by weight.

Example 1

Base oil consisting of mixed oil consisting of poly-α-olefin oil (kinematic viscosity: 30 mm$^2$/s (40° C.)) and alkyldiphenyl ether oil (kinematic viscosity: 97 mm$^2$/s (40° C.)) was prepared at a mixing ratio shown in table 1. The base oil was divided into two solutions. 4,4'-diphenylmethane diisocyanate (MDI) was dissolved in one half of the two solutions. P-toluidine whose equivalent weight was twice larger than the 4,4'-diphenylmethane diisocyanate was dissolved in the other half of the two solutions. As the aromatic diurea compound, the 4,4'-diphenylmethane diisocyanate was dissolved at the mixing ratio shown in table 1. The solution in which the p-toluidine was dissolved was added to the solution in which the 4,4'-diphenylmethane diisocyanate was dissolved, while the latter solution was being stirred. The stirring continued for reaction at 100 to 120° C. for 30 minutes for reaction, and the aromatic diurea compound was mixed with the base oil.

Basic Ca sulfonate, sodium sebacate, and sorbitan triolate were added to the mixture at mixing ratios shown in table 1. The mixture was stirred at 100 to 120° C. for 10 minutes. Thereafter the mixture was cooled and homogenized by a three-roll to obtain a grease composition. A rust test for evaluating the rust resisting performance of the grease composition was conducted. The test method and the test condition are shown below. Table 1 shows the results.

In accordance with the rust test method specified in ASTMD 1743, the rust test was conducted in conditions strict for the generation of rust. After 2.0 g of the grease composition obtained in the example 1 was enclosed in a tapered roller bearing 30204 which was degreased and dried in advance, warming-up of the tapered roller bearing was conducted at 1800 rpm per minute, with an axial load of 98 N applied thereto.

After the bearing was immersed in one part by weight of a saline solution, the bearing was put in a closed high-humidity container in which a saturated vapor pressure was attained at 40° C. After the solution was allowed to stand for 48 hours at 40° C., the situation of the generation of rust was examined. To examine the situation of the generation of rust, an outer ring race was circumferentially divided equally into 32 sections, and the number of sections where rust was formed was counted to measure the percentage of the rust generation. The average of the number n=4 of tests conducted was set as the rust evaluation mark.

Examples 2 through 11

In accordance with the method carried out in the example 1 and at the mixing ratios shown in table 1, base grease was prepared by selecting the thickener and the base oil. Further, additives were added to the base grease to obtain grease compositions. A rust test for evaluating the rust resisting performance of each grease composition was conducted in a manner similar to that of the example 1. Table 1 shows the results.

Comparison Examples 1 through 7

In accordance with the method carried out in the example 1 and at the mixing ratios shown in table 2, base grease was prepared by selecting the thickener and the base oil. Further, additives were added to the base grease to obtain grease compositions. A rust test for evaluating the rust resisting performance of each grease composition was conducted in a manner similar to that of the example 1. Table 2 shows the results.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Mixing(part by weight) | | | | | | | | | | | |
| Base oil | | | | | | | | | | | |
| Synthetic hydrocarbon oil | 15.4 | 15.4 | 15.4 | 15.4 | 15.4 | 15.4 | 15.4 | 15.4 | 15.4 | 17 | 17 |
| Alkyl diphenyl ether oil | 61.6 | 61.6 | 61.6 | 61.6 | 61.6 | 61.6 | 61.6 | 61.6 | 61.6 | 68 | 68 |

TABLE 1-continued

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Thickener Amine | | | | | | | | | | | |
| p-toluidine | 10.7 | 10.7 | 10.7 | 10.7 | 10.7 | 10.7 | 10.7 | 10.7 | 10.7 | — | — |
| Cyclohexylamine | — | — | — | — | — | — | — | — | — | — | 6.6 |
| Octylamine | — | — | — | — | — | — | — | — | — | 7.6 | — |
| Diisocyanate | | | | | | | | | | | |
| MDI | 12.3 | 12.3 | 12.3 | 12.3 | 12.3 | 12.3 | 12.3 | 12.3 | 12.3 | 7.4 | 8.4 |
| Additive | | | | | | | | | | | |
| Na sulfonate | — | — | — | — | — | 0.5 | 1 | — | — | — | — |
| Basic Ca sulfonate | 1 | 0.5 | 0.5 | — | — | — | — | — | — | 1 | 1 |
| Neutral Ca sulfonate | — | — | — | 1 | 0.5 | — | — | — | — | — | — |
| Succinate | — | — | — | — | — | — | — | 1 | 0.5 | — | — |
| Sodium sebacate | 1 | 1.5 | 1 | 1 | 1.5 | 1.5 | 1 | 1 | 1 | 1 | 1 |
| Sorbitan triolate | 1 | 1 | 1.5 | 1 | 1 | 1 | 1 | 1 | 1.5 | 1 | 1 |
| Properties | | | | | | | | | | | |
| Rust generation probability | 3.1 | 6.3 | 9.4 | 7.8 | 11.7 | 10.9 | 13.3 | 7 | 7 | 3.1 | 1.6 |

TABLE 2

| | Comparison Example | | | | | | |
|---|---|---|---|---|---|---|---|
| | 1 | 2 | 3 | 4 | 5 | 6 | 7 |
| Mixing(part by weight) Base oil | | | | | | | |
| Synthetic hydrocarbon oil | 15.4 | 15.4 | 15.4 | 15.4 | 15.4 | 15.4 | 15.4 |
| Alkyl diphenyl ether oil | 61.6 | 61.6 | 61.6 | 61.6 | 61.6 | 61.6 | 61.6 |
| Thickener Amine | | | | | | | |
| p-toluidine | 10.7 | 10.7 | 10.7 | 10.7 | 10.7 | 10.7 | 10.7 |
| Cyclohexylamine | — | — | — | — | — | — | — |
| Octylamine | — | — | — | — | — | — | — |
| Diisocyanate | | | | | | | |
| MDI | 12.3 | 12.3 | 12.3 | 12.3 | 12.3 | 12.3 | 12.3 |
| Additive | | | | | | | |
| Na sulfonate | — | — | 3 | — | — | — | — |
| Basic Ca sulfonate | — | 3 | — | — | — | — | — |
| Aliphatic amine | — | — | — | 1 | — | — | — |
| Ca salicylate | — | — | — | — | — | — | 1 |
| Neutral Ca sulfonate | — | — | — | — | 3 | — | — |
| Succinate | — | — | — | — | — | 3 | — |
| Sodium sebacate | 1.5 | — | — | 1 | — | — | 1 |
| Sorbitan triolate | 1.5 | — | — | 1 | — | — | 1 |
| Sodium nitrite | — | — | — | — | — | — | — |
| Properties | | | | | | | |
| Rust generation probability | 38.3 | 70.3 | 74.2 | 40.6 | 71.1 | 78.1 | 44.5 |

As shown in each example, the rust generation probability of the rust resisting grease of the present invention is much lower than that of the rust resisting grease of each comparison example. By using the synthetic hydrocarbon oil as the base oil and as the rust resisting additives, adding the metallic salt of the polybasic acid, the polyvalent alcohol in which a part of the hydroxyl group is blocked, and at least one compound selected from among the organic sulfonate and the fatty ester to the base oil as the essential components of the rust resisting grease, the rust resisting grease composition excellent in its rust resisting performance was obtained.

INDUSTRIAL APPLICABILITY

The rust resisting grease composition of the present invention does not generate the nitrosamine which is the substance of applying a load to environment nor adversely affect the environment and is excellent in its rust resisting performance. Therefore the grease-enclosed bearing in which the rust resisting grease composition is enclosed in the sliding part is superior in its rust resisting performance and hence can be preferably used for an electric auxiliary machine for use in a car or iron-manufacturing equipment.

The invention claimed is:

1. A rust resisting grease composition comprising a base oil, a thickener, and a rust resisting component,
    wherein said base oil is a mixture consisting of poly-α-olefin oil and alkyl diphenyl ether oil; and said poly-α-olefin oil is 15.4 to 17 parts by weight based on 100 parts by weight of the total amount of said base oil and said thickener and said alkyl diphenyl ether oil is 61.6 to 68 parts by weight based on 100 parts by weight of the total amount of said base oil and said thickener,
    wherein said thickener is a urea thickener,
    wherein said rust resisting component contains a metallic salt of a polybasic acid, a polyvalent alcohol in which a part of a hydroxyl group is blocked, and at least one compound selected from among an organic sulfonate and a fatty ester as essential ingredients thereof.

2. The rust resisting grease composition according to claim 1, wherein a content of said metallic salt of said polybasic acid is set to 0.1 to 10 parts by weight based on 100 parts by weight of the total amount of said base oil and said thickener.

3. The rust resisting grease composition according to claim 1, wherein said metallic salt of said polybasic acid is a metallic salt of a dibasic acid.

4. The rust resisting grease composition according to claim 1, wherein a content of said polyvalent alcohol in which a part of said hydroxyl group is blocked is set to 0.1 to 10 parts by weight with respect to 100 parts by weight based on 100 parts by weight of said base oil and said thickener.

5. The rust resisting grease composition according to claim 1, wherein said polyvalent alcohol in which a part of said hydroxyl group is blocked is a partially esterified sorbitan.

6. The rust resisting grease composition according to claim 1, wherein a content of at least said one compound selected from among said organic sulfonate and said fatty ester is set to 0.1 to 10 parts by weight based on 100 parts by weight of the total amount of said base oil and said thickener.

7. The rust resisting grease composition according to claim 1, wherein said organic sulfonate is a calcium salt or a sodium salt of sulfonic acid.

8. The rust resisting grease composition according to claim 1, wherein said fatty ester is succinate.

9. The rust resisting grease composition according to claim 1, wherein a content of said thickener is set to 5 to 30 parts by weight based on 100 parts by weight of the total amount of said base oil and said thickener.

10. A grease-enclosed bearing having a grease composition enclosed in a sliding portion thereof, wherein said grease composition is a rust resisting grease composition according to claim 1.

11. The grease-enclosed bearing according to claim 10, wherein said bearing is a bearing for use in an electric auxiliary machine for use in a car or in iron-manufacturing equipment.

12. A rust resisting agent for use in a urea thickened grease composition having a mixture consisting of poly-α-olefin oil and alkyl diphenyl ether oil as a base oil, said poly-α-olefin oil being 15.4 to 17 parts by weight based on 100 parts by weight of the total amount of said base oil and said thickener and said alkyl diphenyl ether oil being 61.6 to 68 parts by weight based on 100 parts by weight of the total amount of said base oil and said thickener, said rust resisting agent also containing a metallic salt of a polybasic acid, a polyvalent alcohol in which a part of a hydroxyl group is blocked, and at least one compound selected from among an organic sulfonate and a fatty ester.

13. The rust resisting grease composition according to claim 1, wherein at least one compound is said organic sulfonate.

14. The rust resisting grease composition according to claim 1, wherein at least one compound is said fatty ester.

15. A rust resisting grease composition comprising a base oil, a thickener, and a rust resisting component, wherein
said base oil is a mixture consisting of poly-α-olefin oil and alkyl diphenyl ether oil wherein said poly-α-olefin oil is 15.4 to 17 parts by weight based on 100 parts by weight of the total amount of said base oil and said thickener and said alkyl diphenyl ether oil is 61.6 to 68 parts by weight based on 100 parts by weight of the total amount of said base oil and said thickener and said thickener is an aromatic urea thickener,
said rust resisting component contains sodium sebacate, sorbitan trioleate, and basic calcium sulfonate as essential ingredients thereof.

16. The rust resisting grease composition according to claim 5, wherein said partially esterified sorbitan is sorbitan trioleate.

17. The rust resisting grease composition according to claim 7, wherein said calcium salt of sulfonic acid is basic calcium sulfonate.

18. The rust resisting grease composition according to claim 1, wherein said urea thickener is an aromatic urea thickener.

19. The rust resisting grease composition according to claim 3, wherein said metallic salt of said dibasic acid is a metallic salt of sebacic acid.

20. The rust resisting grease composition according to claim 19, wherein said metallic salt of said sebacic acid is sodium sebacate.

21. The rust resisting grease composition according to claim 1, wherein a content of said metallic salt of said polybasic acid is set to 1 to 1.5 parts by weight based on 100 parts by weight of the total amount of said base oil and said thickener.

22. The rust resisting grease composition according to claim 15, wherein a content of said sodium sebacate is set to 1 to 1.5 parts by weight based on 100 parts by weight of the total amount of said base oil and said thickener.

23. The rust resisting grease composition according to claim 1, wherein a content of said polyvalent alcohol is set to 1 to 1.5 parts by weight based on 100 parts by weight of the total amount of said base oil and said thickener.

24. The rust resisting grease composition according to claim 15, wherein a content of said sorbitan trioleate is set to 1 to 1.5 parts by weight based on 100 parts by weight of the total amount of said base oil and said thickener.

25. The rust resisting grease composition according to claim 1, wherein a content of said at least one compound is set to 0.5 to 1 part by weight based on 100 parts by weight of the total amount of said base oil and said thickener.

26. The rust resisting grease composition according to claim 15, wherein a content of said basic calcium sulfonate is set to 0.5 to 1 part by weight based on 100 parts by weight of the total amount of said base oil and said thickener.

27. The rust resisting grease composition according to claim 1, wherein said thickener is an aromatic urea thickener prepared by reacting an amine consisting of p-toluidine and an isocyanate consisting of 4,4'-diphenylmethane diisocyanate.

* * * * *